US012709531B2

(12) United States Patent
Mendez, Jr. et al.

(10) Patent No.: US 12,709,531 B2
(45) Date of Patent: Aug. 18, 2026

(54) DUAL-SIDED PALLET PULLER (DSPP)

(71) Applicant: United States of America as represented by the Secretary of the Navy, San Diego, CA (US)

(72) Inventors: Frank Morales Mendez, Jr., Mount Laurel, NJ (US); Timothy Hausman, Mount Royal, NJ (US); Frank D. Greco, Edgewater, NJ (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 933 days.

(21) Appl. No.: 18/059,573

(22) Filed: Nov. 29, 2022

(65) Prior Publication Data

US 2024/0174501 A1 May 30, 2024

(51) Int. Cl.

*B66F 19/00* (2006.01)

*B66C 1/58* (2006.01)

(52) U.S. Cl.

CPC ................ *B66F 19/00* (2013.01); *B66C 1/58* (2013.01)

(58) Field of Classification Search

CPC .... B66C 1/10; B66C 1/34; B66C 1/38; B66C 1/42; B66C 1/422; B66C 1/44; B66C 1/442; B66C 1/48; B66C 1/54; B66C 1/56; B66C 1/58; B66C 1/585; B66C 1/59; B66C 1/62; B66C 1/625; B66C 1/64; B66C 1/66; B66C 1/663; B66C 3/06; B66C 3/08; B66C 3/10; B66C 3/105; B66C 3/12; B66C 3/125; B66F 19/00; B66F 19/005; B66F 9/18; B66F 9/183; B66F 9/186; B66F 9/187;

(Continued)

(56) References Cited

U.S. PATENT DOCUMENTS 370,350 A * 9/1887 Porter ........................ B66C 1/34 294/82.11

673,356 A * 4/1901 Brittain .................. B66C 1/422 294/118

(Continued)

OTHER PUBLICATIONS

Baremotion.com, Medium Duty Grade 70 Tie Down Binder Chain Kit (8 chains), Aug. 30, 2020, Baremotion.com <https://web.archive.org /web/20200930205918/https://www.baremotion.com/products/medium-duty-grade-70-transport-binder-chain-kit> (Year: 2020).*

(Continued)

*Primary Examiner* — Joshua E Rodden

(74) *Attorney, Agent, or Firm* — Naval Information Warfare; Kyle Eppele; J. Eric Anderson

(57) ABSTRACT

A pallet puller including: a first bar having a first hook disposed on a distal end of the first bar, wherein the first hook is a wedge connected to the distal end of the first bar; a second bar having a second hook disposed on a distal end of the second bar, wherein the second hook is a wedge connected to the distal end of the second bar; a ring loosely coupled to a proximal end of the first bar and to a proximal end of the second bar such that the first and second bars are able to move with respect to the ring and such that pointed ends of the first and second hooks are pointed in opposite directions with respect to each other; and a line having a proximal end coupled to the ring and a distal end terminated in a connection point.

20 Claims, 4 Drawing Sheets

(58) Field of Classification Search
CPC .......... B66F 9/19; F16B 45/02; F16B 45/021; F16B 45/043; F16B 45/06; F16L 3/11
USPC .......................................................... 294/82.1
See application file for complete search history.

(56) References Cited

U.S. PATENT DOCUMENTS

| | | | | | |
|---|---|---|---|---|---|
| 696,873 | A * | 4/1902 | Langan | B66C 1/34 | 294/82.13 |
| 758,199 | A * | 4/1904 | Alexander | B66C 1/422 | 294/110.1 |
| 1,344,174 | A * | 6/1920 | Clogston | B66C 1/58 | 294/118 |
| 1,927,731 | A * | 9/1933 | Badger | B66C 1/58 | 294/16 |
| 2,354,107 | A * | 7/1944 | Diamond | B66C 1/64 | 294/82.13 |
| 2,817,556 | A * | 12/1957 | White | F16B 45/06 | 294/116 |
| 3,073,613 | A | 1/1963 | Bergstrom, Jr. | | |
| 3,727,966 | A | 4/1973 | Stockwell | | |
| 3,807,786 | A | 4/1974 | Alegria | | |
| 3,958,825 | A * | 5/1976 | Diamond | B66C 1/64 | 294/92 |
| 4,094,544 | A | 6/1978 | Spaine | | |
| 4,098,533 | A | 7/1978 | Hanlon, Jr. | | |
| 4,171,842 | A * | 10/1979 | Tolle | B66C 1/34 | 414/563 |
| 4,326,744 | A * | 4/1982 | Long, III | B66C 1/34 | 15/268 |
| 4,421,353 | A | 12/1983 | Smith, Jr. | | |
| 4,629,238 | A * | 12/1986 | Woodruff | B66C 1/58 | 294/92 |
| 5,791,711 | A | 8/1998 | Tobias | | |
| 6,428,069 | B1 | 8/2002 | Simonson, Jr. | | |
| 7,562,921 | B2 | 7/2009 | Fitzgerald | | |
| 10,112,805 | B1 * | 10/2018 | Joralmon | B66C 1/14 | |
| 2005/0230986 | A1 * | 10/2005 | Lindberg | B66C 1/58 | 294/118 |
| 2012/0280521 | A1 * | 11/2012 | LeBlanc | B66C 1/34 | 294/67.2 |

OTHER PUBLICATIONS

Simonson Jr., Russell L.; Buzzbar, Pallet Puller and Turner for Stringer Pallets; https://www.buzzbar.com, available at least as early as Oct. 14, 2022.

Safepul; 40ft Container Pallet Puller with 11.70m Strap; https://www.safepul.com/products/safepul-containter-pallet-puller-with-11-07m-strap; available at least as early as Oct. 2022.

Uline; Pallet Puller H-127-Uline; https://www.uline.com/Product/Detail/H-127/Pallet-Puller/Pallet-Puller; available at least as early as Oct. 2022.

Jme Ellsworth; Vestil Pallet Puller—Cam Action Scissor—John M. Ellsworth, Co. Inc.; https://www.jmesales.com/Vestil-Pallet-Pullers-Cam-Action-Scissor/; available at least as early as Oct. 2022.

rigging.com; Domestic-Wire Rope Sling-Two Leg with Hooks; https://www.rigging.com/domestic-wire-rope-sling-two-leg-with-hooks.html; available at least as early as Oct. 2022.

Grainger; Barrel Hook, 1,500 lb Load Capacity; https://www.grainger.com/product/AMPCO-Barrel-Hook-8DFC1; 1994.

Technical Ship Supplies; Drum Hook Chain Type for 1 Drum IMPA 614025; https://www.technicalshipsupplies.com/products/DRUM-HOOK-CHAIN-TYPE-FOR-1-DRUM.html; available at least as early as Oct. 2022.

* cited by examiner

DUAL-SIDED PALLET PULLER (DSPP)

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 108139.

BACKGROUND OF THE INVENTION

This invention relates to the field of devices used to manipulate pallets. Cargo is routinely shipped on pallets, which frequently need to be repositioned once they have arrived at their destination such that a forklift may remove the pallets from the transport vehicle. There is a need for a simple device that can be used to safely reposition many different types of pallets in a short amount of time.

SUMMARY

Disclosed herein is a pallet puller comprising a first bar, a second bar, a ring and a line. The first bar has a first hook disposed on a distal end of the first bar, and the first hook is a wedge connected to the distal end of the first bar. The second bar has a second hook disposed on a distal end of the second bar, and the second hook is a wedge connected to the distal end of the second bar. The ring is loosely coupled to a proximal end of the first bar and to a proximal end of the second bar such that the first and second bars are able to move with respect to the ring and such that pointed ends of the first and second hooks are pointed in opposite directions with respect to each other. The line has a proximal end that is coupled to the ring and a distal end that is terminated in a connection point.

Another embodiment of the pallet puller is also disclosed herein as comprising: a first bar, a second bar, a link, and a line. In this embodiment, the first bar has a first hook disposed on a distal end of the first bar, and the second bar has a second hook disposed on a distal end of the second bar. The link is coupled to a proximal end of the first bar and to a proximal end of the second bar such that the first and second bars are able to move with respect to the link and such that the first and second hooks are pointed in opposite directions. The distance between the proximal and distal ends of each of the first and second bars is greater than or equal to a third of a length of a pallet's center stringer. The line has a proximal end coupled to the link and a distal end that is terminated in a connection point. When the distal ends of the first and second bars are inserted into the pallet on either side of the center stringer and when any slack in the line is removed by pulling the connection point in a direction away from the pallet, the first and second hooks are configured to grip the center stringer or to hook into a notch in the center stringer.

Another embodiment of the pallet puller is also disclosed herein as comprising: first and second bars, a ring, and a line. The first bar is approximately forty seven centimeters long and has a first hook disposed on a distal end of the first bar. The first hook is an approximately 6.5 centimeter-long wedge connected to the distal end of the first bar. The second bar is also approximately forty seven centimeters long and has a second hook disposed on a distal end of the second bar.

The second hook is an approximately 6.5 centimeter-long wedge connected to the distal end of the second bar. The ring is loosely coupled to a proximal end of the first bar and to a proximal end of the second bar such that the first and second bars are able to move with respect to the ring. The first and second bars are coupled to the ring in such a way that pointed ends of the first and second hooks are pointed in opposite directions with respect to each other. The line has a proximal end coupled to the ring and a distal end terminated in a connection point.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
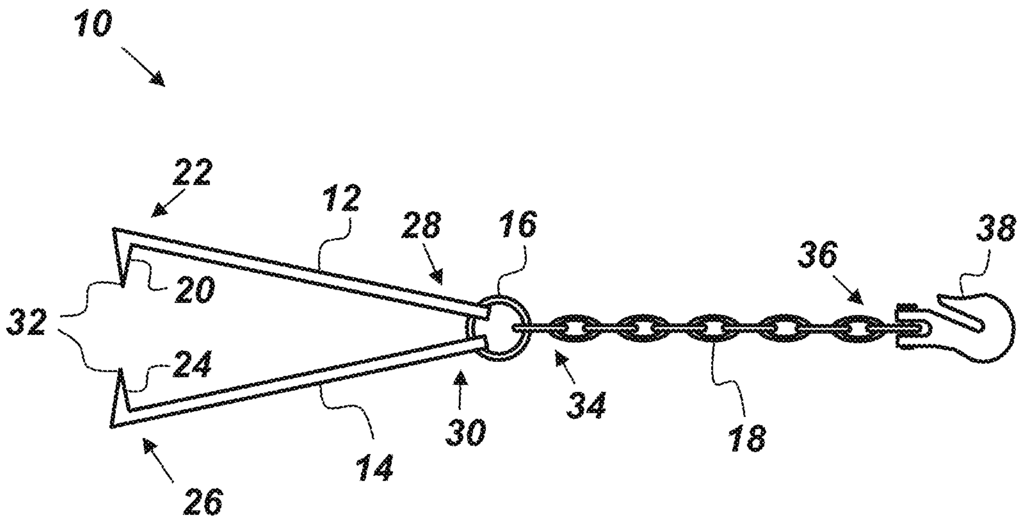
FIG. 1A is a top-view illustration of an embodiment of a pallet puller.

FIG. 1A is a top-view illustration of a pallet puller 10 that comprises, consists of, or consists essentially of a first bar 12, a second bar 14, a ring 16, and a line 18. The first bar 12 has a first hook 20 disposed on a distal end 22 of the first bar 12. The second bar 14 has a second hook 24 disposed on a distal end 26 of the second bar 14. The first and second hooks 20 and 24 may be wedge-shaped such as is shown in FIG. 1A. The ring 16 is loosely coupled to a proximal end 28 of the first bar 12 and to a proximal end 30 of the second bar 14 such that the first and second bars 12 and 14 are able to move with respect to the ring 16 and such that pointed ends 32 of the first and second hooks 20 and 24 are pointed in opposite directions with respect to each other. The line 18 has a proximal end 34 that is coupled to the ring 16 and a distal end 36 that is terminated in a connection point 38.

Figure 1B:
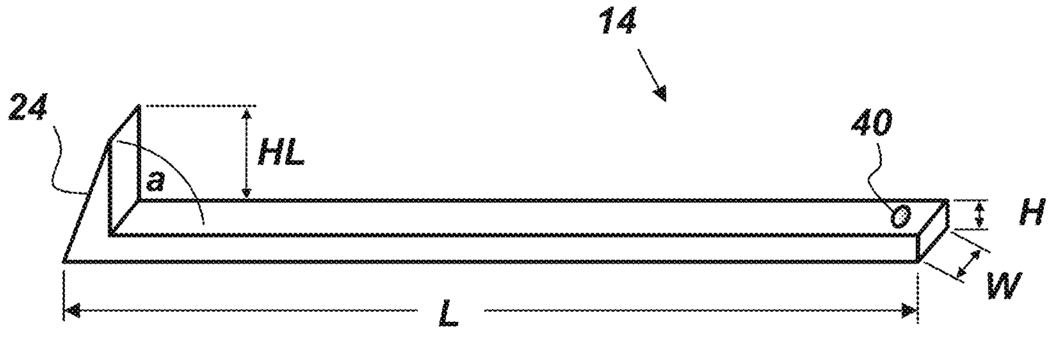
FIG. 1B is a perspective-view illustration of a side bar of an embodiment of a pallet puller.

FIG. 1B is an enlarged top-view of the second bar 14. The first and second bars 12 and 14 may share the same dimensions. The first and second bars 12 and 14 may be any desired length. In one example embodiment of the pallet puller 10, each of the first and second bars 12 and 14 are made of steel and have a length L of approximately 47 centimeters (18 inches), a height H of approximately 0.64 centimeters (¼ inch), and a width W of approximately 2.54 centimeters (1 inch). Preferably, the first and second hooks 20 and 24 are respectively offset from the first and second bars 12 and 14 by an angle α of 75° to 90°. The first and second hooks 20 and 24 may have a hook length HL between approximately 3.8 centimeters (1.5 inches) and approximately 6.35 centimeters (2.5 inches). The first and second hooks 20 and 24 are shown in FIG. 1A as having a wedge shape, but the first and second hooks 20 and 24 are not limited to wedge shapes. Another alternative shape for the first and second hooks 20 and 24 may be an inward-curving shape such as a sickle. The first and second hooks 20 and 24 may be attached to the first and second bars 12 and 14 by welding, brazing, soldering, or with fasteners. Alternatively, the first and second hooks 20 and 24 and the first and second bars 12 and 14 may be manufactured out of the same material such as cut out of the same piece of steel or via additive manufacturing methods.

A suitable example of the ring 16, includes, but is not limited to a steel ring having diameter of approximately 7.6 centimeters (three inches) and a cross-sectional diameter of approximately 0.64 centimeters (¼ inch). The ring 16 passes through holes in the first and second bars 12 and 14 so as to allow the first and second bars 12 and 14 to move freely about the ring 16. A hole 40 is shown in FIG. 1B. Suitable examples of the line 18 include, but are not limited to, chain, rope, and webbing. In one embodiment, the line 18 is 2.4 meters (8 feet) long and made of , grade 70 chain and the connection point 38 is a grab hook suitable for grabbing a 5⁄16" chain.

Figure 2A:
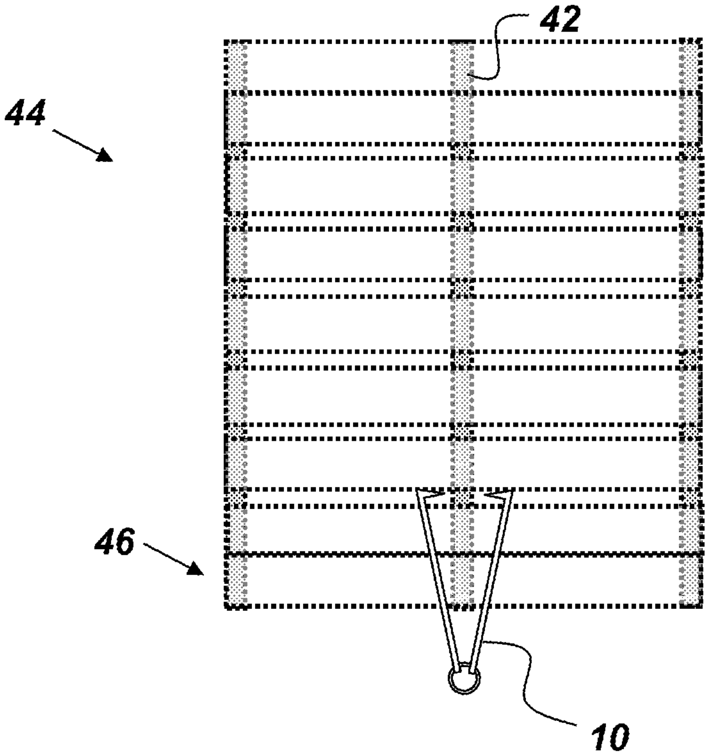
FIG. 2A is a top-view illustration of an embodiment of a pallet puller interacting with a pallet.
Figure 2B:
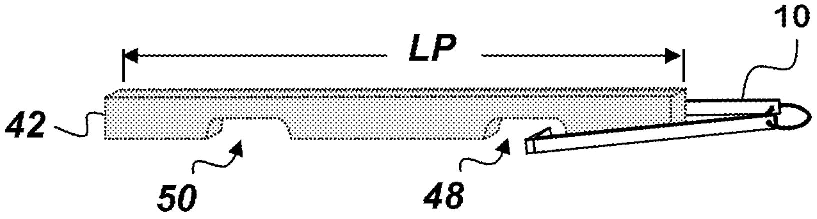
FIG. 2B is a perspective-view illustration of an embodiment of a pallet puller and a center stringer of a pallet.
Figure 3A:
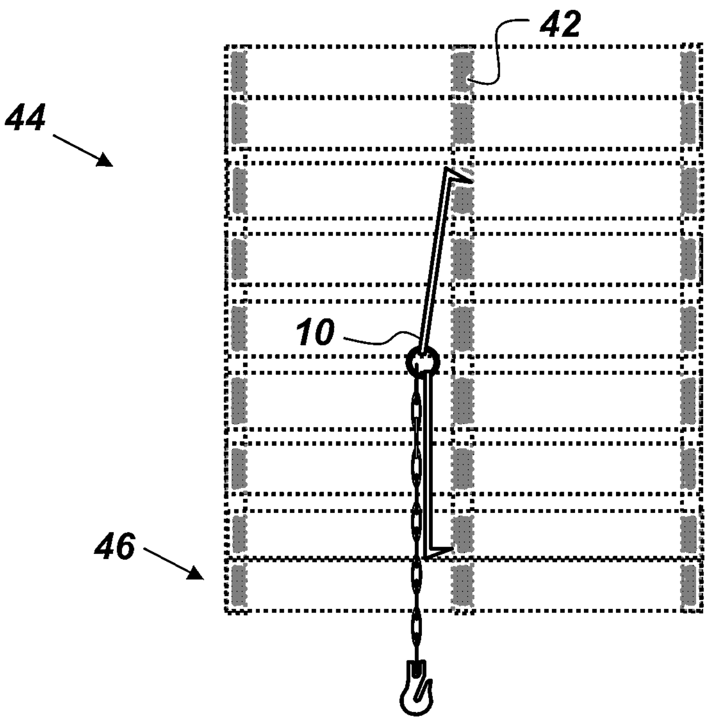
FIG. 3A is a top-view illustration of an alternative way for an embodiment of a pallet puller to interact with a pallet.

FIGS. 2A and 3A are both top views, and FIG. 2B are both perspective views, of an embodiment of the pallet puller 10 interacting with a center stringer 42 of a two-way pallet 44. The pallet puller 10 may be inserted into a front end 46 of the pallet 44, so that the two bars 12 and 14, with hooks 20 and 24 facing inward, straddle the center stringer 42, as shown in FIG. 2A, such that one bar is on either side of the center stringer 42. The bars 12 and 14 may then be pushed together while pulling on the line 18 to create tension so that the hooks 20 and 24 don't fall off. In the meantime, the connection point 38 may be attached to a forklift (not shown). The forklift then backs up pulling the loose line 18 tight, and then by continuing to pull backwards the pallet 42 is moved. The setup and removal of the pallet puller 10 only takes seconds. The pallet 42 may then be moved closer to an edge of a truck/trailer/loading bay/etc. where it may more easily be picked up by the forklift after the pallet puller is removed. The pallet puller 10 works especially well when pallets are twisted (i.e. misaligned) or need to be moved into a better position for the forklift to access.

Figure 3B:
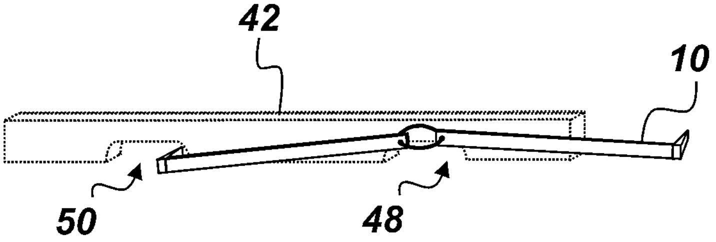
FIG. 3B is a perspective-view illustration of an embodiment of a pallet puller and a center stringer of a pallet.

The hooks 20 and 24 may be inserted into font notch 48 in the center stringer 42, as shown in FIG. 2B. Alternatively, for heavier loads, one bar of the pallet puller 10 may be fed through the front end 46 and inserted into a back notch 50 in the center stringer 42, such as shown in FIGS. 3A and 3B. The pallet puller 10 may also be used with pallets that lack front and back notches in the center stringer, or even with pallets that lack a center stringer all together. For example, the pallet puller 10 may be used to pull one-way, stringer pallets that do not have notches in their center stringers by inserting the first and second hooks 20 and 24 through the front end of a pallet, one bar on either side of its center stringer, such as is shown in FIG. 2A, such that when the line 18 is pulled away from the pallet the first and second hooks 20 and 24 bite into the center stringer thereby gripping the pallet.

Figure 4A:
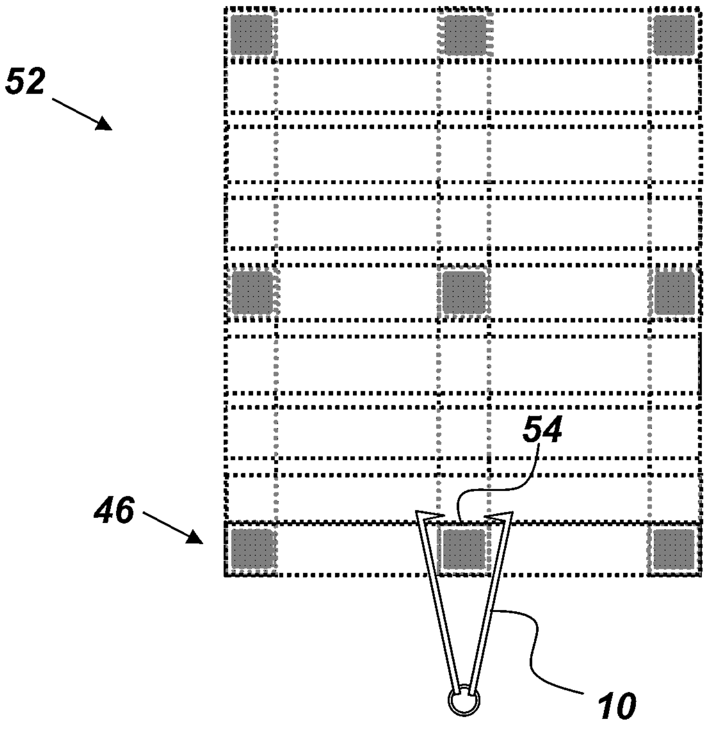
FIG. 4A is a top-view illustration of an embodiment of a pallet puller interacting with a block pallet.
Figure 4B:
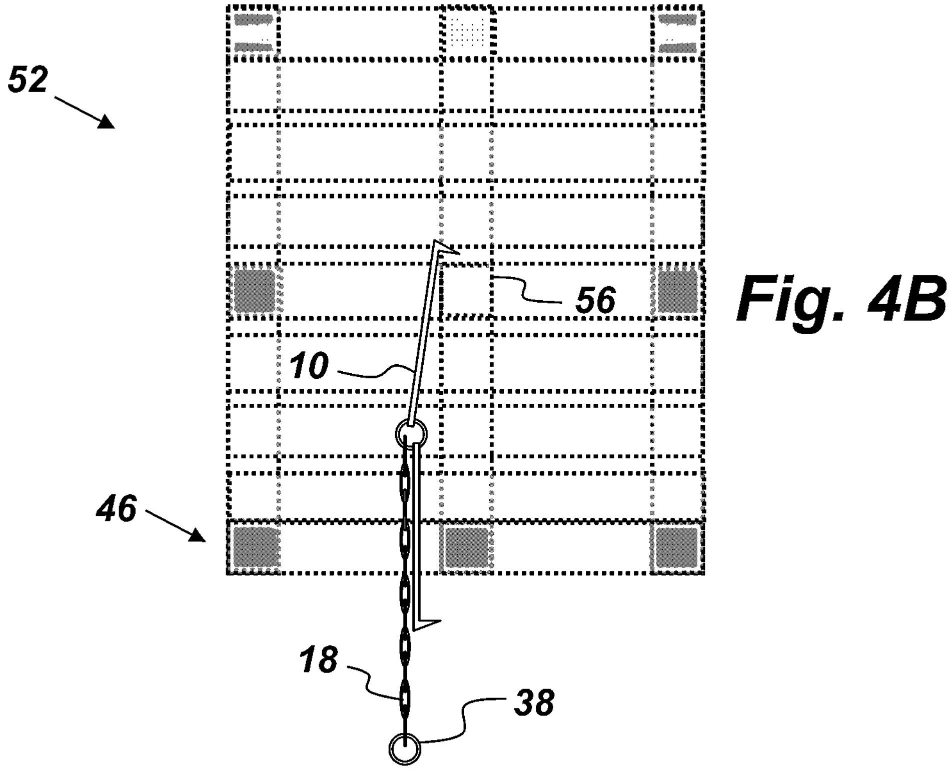
FIG. 4B is a top-view illustration of an alternative way for an embodiment of a pallet puller to interact with a block pallet.

FIGS. 4A and 4B are both top views of an embodiment of the pallet puller 10 interacting with a block pallet 52, which lacks stringers entirely. As shown in FIG. 4A, the first and second bars 12 and 14 may be placed on either side of a front-center block 54 of the block pallet 52 such that the first and second hooks 20 and 24 wrap around the front-center block 54. Alternatively, as shown in FIG. 4B, one bar (e.g., bar 12) of the pallet puller 10 may be fed through the front end 46 of the block pallet 52 such that its corresponding hook (e.g., hook 20) is placed behind a middle block 56 such that when the line 18 is tightened, the pallet 52 is pulled forward. Pulling from the rear of a loaded pallet allows for a safer way of moving pallets without destroying the load. It is also a great tool to use when there are no pallet jacks available. In some embodiments of the pallet puller, the length L of each bar, which also may be described as a distance between the proximal and distal ends of each of the first and second bars, is greater than or equal to a third of a length LP of a pallet's center stringer.

From the above description of the pallet puller 10, it is manifest that various techniques may be used for implementing the concepts of the pallet puller 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the pallet puller 10 is not limited to the particular embodiments described herein, but is capable of many embodiments without departing from the scope of the claims.

We claim:

1. A pallet puller for pulling a pallet, the pallet puller comprising:

a first bar having a first hook disposed on a distal end of the first bar, wherein the first hook is a wedge connected to the distal end of the first bar;

a second bar having a second hook disposed on a distal end of the second bar, wherein the second hook is a wedge connected to the distal end of the second bar;

a ring loosely coupled to a proximal end of the first bar and to a proximal end of the second bar such that the first and second bars are able to move with respect to the ring and such that pointed ends of the first and second hooks are pointed in opposite directions with respect to each other when the first and second hooks are in contact with each other; and a line having a proximal end coupled to the ring and a distal end terminated in a connection point.

2. The pallet puller of claim 1, wherein each wedge is disposed at an angle of 75 degrees with respect to each wedge's respective bar.

3. The pallet puller of claim 2, wherein the first and second bars are each approximately forty seven centimeters long.

4. The pallet puller of claim 3, wherein the line is a grade 70 chain and the connection point is a chain hook.

5. The pallet puller of claim 4, wherein first and second bars are made of steel and the first and second hooks are respectively welded to the distal ends of the first and second bars.

6. The pallet puller of claim 5, wherein the proximal ends of the first and second bars comprise holes through which the ring is disposed, and wherein the ring is a steel ring having a diameter of approximately 7.6 centimeters and a cross-sectional diameter of approximately 0.6 centimeters.

7. The pallet puller of claim 6, wherein the first and second bars are only connected to each other via the ring.

8. The pallet puller of claim 7, wherein the pallet is a two-way pallet, and wherein a distance between the proximal and distal ends of each of the first and second bars is configured to be greater than or equal to a third of a length of a center stringer of the two-way pallet.

9. A pallet puller for pulling a pallet, the pallet puller comprising:

a first bar having a first hook disposed on a distal end of the first bar;

a second bar having a second hook disposed on a distal end of the second bar;

a link coupled to a proximal end of the first bar and to a proximal end of the second bar such that the first and second bars are able to move with respect to the link and such that the first and second hooks are pointed in opposite directions when the first and second hooks are in contact with each other, wherein a distance between the proximal and distal ends of each of the first and second bars is configured to be greater than or equal to a third of a length of a center stringer of the pallet; and a line having a proximal end coupled to the link and a distal end terminated in a connection point such that when the distal ends of the first and second bars are inserted into the pallet on either side of the center stringer and when any slack in the line is removed by pulling the connection point in a direction away from the pallet, the first and second hooks are configured to grip the center stringer or to hook into a notch in the center stringer.

10. The pallet puller of claim 9, wherein the first and second hooks are wedges respectively connected to the distal ends of the first and second bars.

11. The pallet puller of claim 10, wherein each wedge is disposed at an angle of 75 degrees with respect to each wedge's respective bar.

12. The pallet puller of claim 11, wherein the first and second bars are each approximately forty seven centimeters long.

13. The pallet puller of claim 12, wherein when the pallet is a one-way pallet and any slack in the line is removed by pulling the connection point in a direction away from the pallet, the hooks are configured to dig into the center stringer.

14. The pallet puller of claim 13, wherein the link is a steel ring and wherein the proximal ends of the first and second bars comprise holes through which the ring is disposed.

15. A pallet puller for pulling a pallet, the pallet puller comprising:

a first bar being approximately forty seven centimeters long and having a first hook disposed on a distal end of the first bar, wherein the first hook is an approximately 6.5 centimeter-long wedge connected to the distal end of the first bar;

a second bar being approximately forty seven centimeters long and having a second hook disposed on a distal end of the second bar, wherein the second hook is an approximately 6.5 centimeter-long wedge connected to the distal end of the second bar;

a ring loosely coupled to a proximal end of the first bar and to a proximal end of the second bar such that the first and second bars are able to move with respect to the ring and such that pointed ends of the first and second hooks are pointed in opposite directions with respect to each other when the first and second hooks are in contact with each other; and a line having a proximal end coupled to the ring and a distal end terminated in a connection point.

16. The pallet puller of claim 15, wherein each wedge is disposed at an angle of 75 degrees with respect to each wedge's respective bar.

17. The pallet puller of claim 16, wherein the first and second bars are straight and rigid, and are not connected to each other in any way other than the ring.

18. The pallet puller of claim 17, wherein first and second bars are made of steel and the first and second hooks are respectively welded to the distal ends of the first and second bars.

19. The pallet puller of claim 18, wherein the proximal ends of the first and second bars comprise holes through which the ring is disposed.

20. The pallet puller of claim 19, wherein the pallet is a two-way pallet, and wherein a distance between the proximal and distal ends of each of the first and second bars is configured to be greater than or equal to a third of a length of a center stringer of the two-way pallet.

* * * * *